United States Patent
Dauge et al.

[11] 3,903,766
[45] Sept. 9, 1975

[54] MULTIHOLDER TOOL HEAD

[76] Inventors: Vitaly Teodorovich Dauge, ulitsa Malaya Naberezhnaya 7, kv. 20; Kirill Vladimirovich Buznyakov, ulitsa Lesteva 20, kv. 12, both of Moscow, U.S.S.R.

[22] Filed: June 15, 1973

[21] Appl. No.: 370,469

[52] U.S. Cl. .............................. 82/36 A; 74/813 L
[51] Int. Cl. ............................................ B23b 29/28
[58] Field of Search............ 82/36 A; 74/813 L, 826

[56] References Cited
UNITED STATES PATENTS

| | | | |
|---|---|---|---|
| 1,227,486 | 5/1917 | Newman et al. | 82/36 A |
| 2,324,603 | 7/1943 | Strobl | 82/36 A |
| 2,862,408 | 12/1958 | Stirrett | 82/36 A |

FOREIGN PATENTS OR APPLICATIONS

| | | | |
|---|---|---|---|
| 1,085,374 | 7/1954 | France | 82/36 A |

*Primary Examiner*—Leonidas Vlachos
*Attorney, Agent, or Firm*—Waters, Schwartz & Nissen

[57] ABSTRACT

In a multiholder tool head, according to the invention, a toolholder is provided with carrier means making it possible to maintain the constant torque during the rotation of the toolholder and to ensure constant pressing of a clamp disposed between a base and the toolholder against the surface of a socket and that of recesses, said socket and recesses being made in said base and the toolholder respectively. This ensures high positional stability of the toolholder when locked in any of the predetermined positions.

2 Claims, 5 Drawing Figures

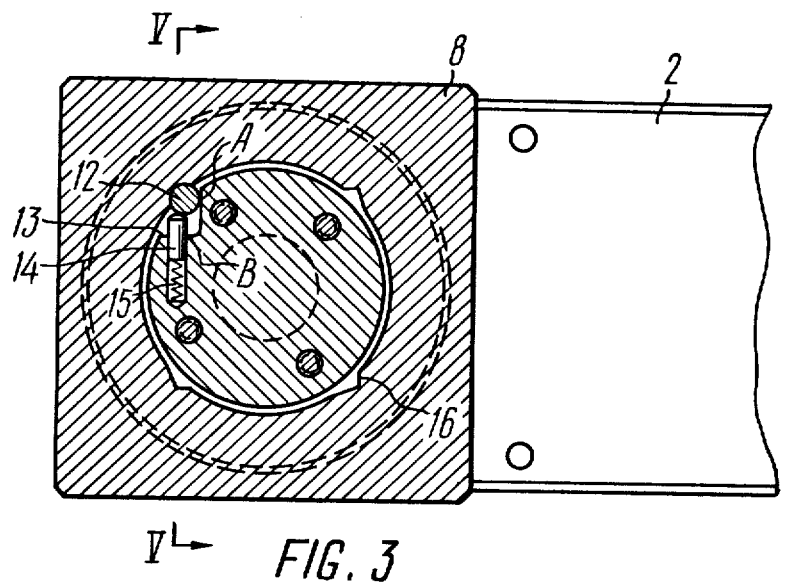
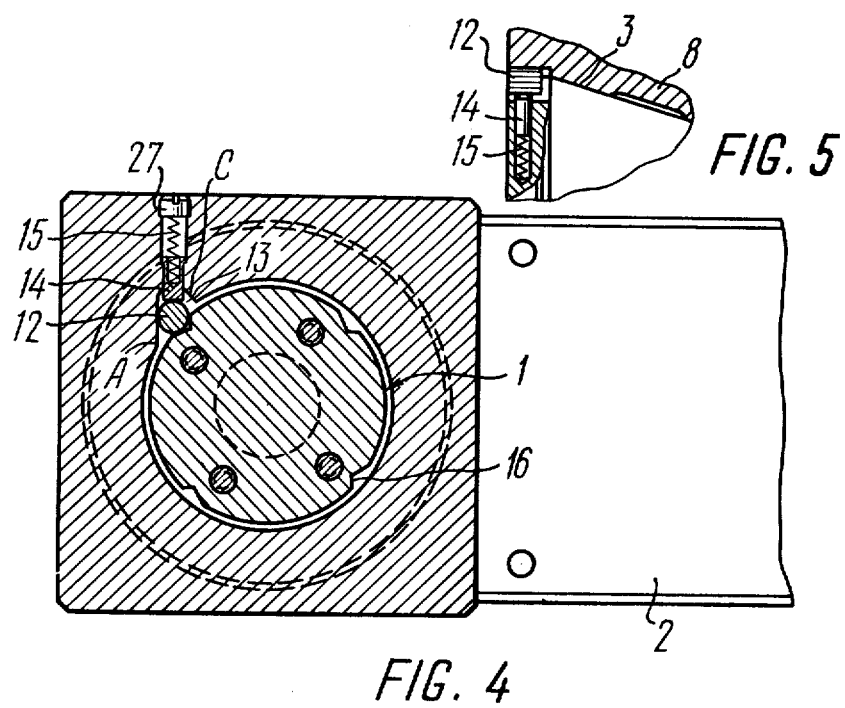

MULTIHOLDER TOOL HEAD

This invention relates to means for clamping cutting tools in machine tools and more particularly to multiholder tool heads.

More particularly, this invention may be used for locking tools in lathes and turret lathes.

This invention may be the most advantageously used in multi-purpose and automatic machine tools requiring sequential machining of a workpiece, such as stepped shaft, using different types of cutting tools.

There is known a multiholder tool head having a cone-shaped base rotatably mounting a toolholder with respect to the axis of the cone and providing the clamping thereof, said toolholder engaging the base over the conical surface thereof and being provided with a clamp for positioning the toolholder in any predetermined position after having been rotated to this position.

The base of the conventional multiholder tool head is formed with a shank having an external thread for mounting a hub adapted to position the toolholder on the base.

A flange with a shoulder is fixed to the toolholder, said shoulder being accommodated in an annular recess provided in the hub surface facing the toolholder. There is a clamp in the toolholder, said clamp being essentially a cylinder with a skewed flat partially accommodated in the stem of the toolholder. The axis of the cylinder is in parallel with the rotational axis of the toolholder. A number of recesses are made in the base of the head to receive the clamp, this number being equal to that of the locking positions for the toolholder.

The toolholder is also provided with the auxiliary clamp for preliminary orientating the toolholder with respect to the base. This auxiliary clamp comprises a spring-loaded ball inserted into one of recesses provided in the side surface of the base.

When it is required to change a cutting tool, the toolholder of the tool head should be rotated about its axis. To this end, the hub, which is usually equipped with a handle intended for the purpose, is unscrewed. During this operation the hub is moving up along the threaded shank of the base carrying away the flange fixed to the toolholder.

The toolholder is separated from the base and a gap is formed between the conical surface of the base and the toolholder. The raising of the toolholder is continued until the clamp moving along with the toolholder leaves the recess of the base.

The toolholder, after having been rotated about the axis, is installed manually into new position. The predetermined position of the toolholder each is determined by the moment when the ball of the auxiliary clamp is caught by one of the recesses provided in the side surface of the base. Then the hub is screwed up again to clamp the toolholder on the base. The clamp which is partially disposed in the body of the toolholder enters one of the recesses formed on the base.

The conventional tool head of the character set forth hereinbefore offers a number of disadvantages one of which consists in defining a gap between the toolholder and the base during the rotation of the former which reduce the stability of clamping due to the danger of penetration of foreign objects into said gap with subsequent impair of the reference base for positioning the toolholder with respect to the base of the tool head.

Another disadvantage of the conventional tool head consists in using the auxiliary clamp the provision of which complicates the structure of the tool head.

Still further disadvantage of the prior art structure consists in that the change of the positions of the toolholded and the rotation of the handle mounted on the hub should be performed from different sources of movement. Furthermore, it is impossible to lock the toolholder in an intermediate position.

It is an object of the present invention to eliminate the above disadvantages and to provide a multiholder tool head characterized by increased stability of locking in predetermined positions, by convenience in operation and by simplicity in structure.

These and other objects are achieved in a multiholder tool head having a cone-shaped base rotatably mounting a toolholder with respect to the axis of the cone and providing the locking thereof, said toolholder engaging the base over the conical surface thereof and being provided with a clamp for positioning the toolholder in any predetermined position after having been rotated into this position.

According to the invention, the toolholder is provided with carrier means, the clamp being spring-loaded and at the moment of the rotation of the toolholder it is accommodated in a socket made in one of the engaging parts while the recesses provided in the other of the engaging parts are equal in number to the predetermined locking positions of the toolholder, the clamp projecting into one of the last-mentioned recesses under the action of spring forces, the path of movement of said clamp extending in a plane transverse to the rotational axis of the toolholder.

In the device according to the invention, the conical surface of the base and the surface of the toolholder are maintained in constant engagement, thereby preventing the foreign objects from entering the gap therebetween. This condition improves the positioning of the toolholder with respect to the base.

It is expedient to provide the carrier means with a hub mounted on the base over the toolholder coaxially therewith, said hub accommodating two members of a frictional clutch with at least one resilient element disposed therebetween and biasing each of the clutch members to the inner surface of the hub to transmit torque from the hub to the toolholder, and with two fingers rigidly fixed to the toolholder in parallel with the rotational axis thereof and passing through openings provided in each of the clutch members.

The above-described structure of the carrier means for the toolholder makes it possible to improve the operational conditions for the tool head as both the rotation and the locking of the toolholder are controlled from a single handle attached to the hub.

According to one embodiment of the invention, the socket receiving the clamp during the rotation of the toolholder is formed in the base while the recesses are made in the toolholder.

According to another embodiment of the invention, the socket receiving the clamp during the rotation of the toolholder is formed in the stem of the toolholder while the recesses are made in the side surface of the base.

It is also advantageous to make the locking element in the form of a cylindrical roller, the axis of this roller being in parallel with the rotational axis of the toolholder.

The roller is the best form of a clamping element as it ensures the line contact at the first stage and the surface contact conditions after running-in, thereby increasing the positioning stability of the toolholder.

Still another embodiment of the tool head, according to the invention, provides the positioning of a thrust bearing between the end face of the hub and the surface of the toolholder normal to the rotational axis thereof.

This makes it possible to reduce the force which should be applied to the handle mounted on the hub for clamping the toolholder with respect to the base.

The invention will now be explained with reference to specific embodiments thereof illustrated in the accompanying drawings, wherein:

FIG. 3 is a sectional view along lines III—III of FIG. 1 illustrating one embodiment of the clamp;

FIG. 4 is a view similar to that shown in FIG. 3 illustrating another embodiment of the clamping mechanism;

FIG. 5 is a sectional view taken along lines V—V of FIG. 3.

Figure 1:
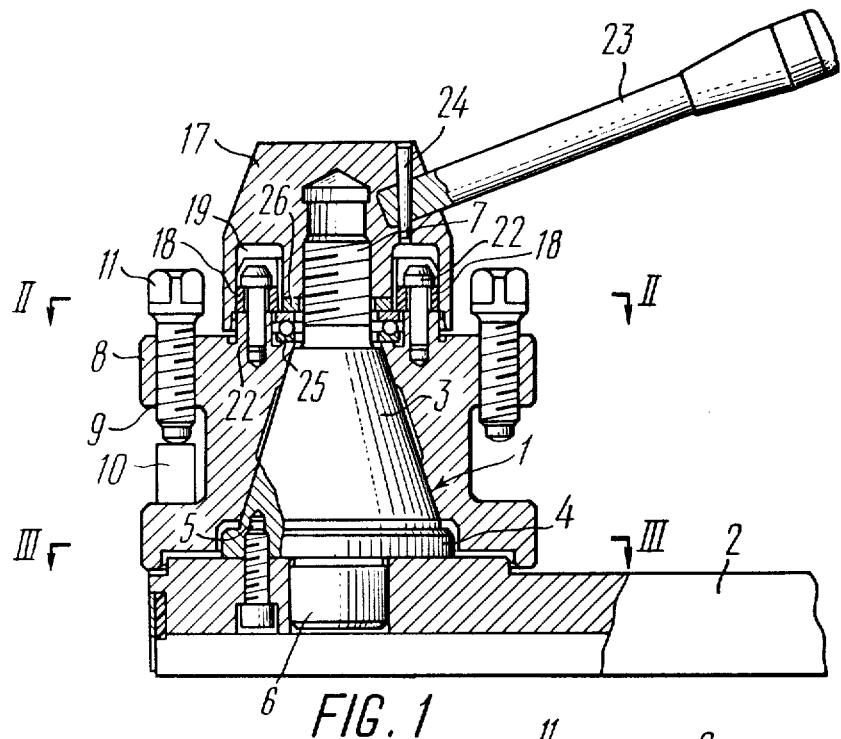
FIG. 1 is a longitudinal - section view of the multiholder tool head, according to the invention, taken along the rotational axis of the toolholder.
Figure 2:
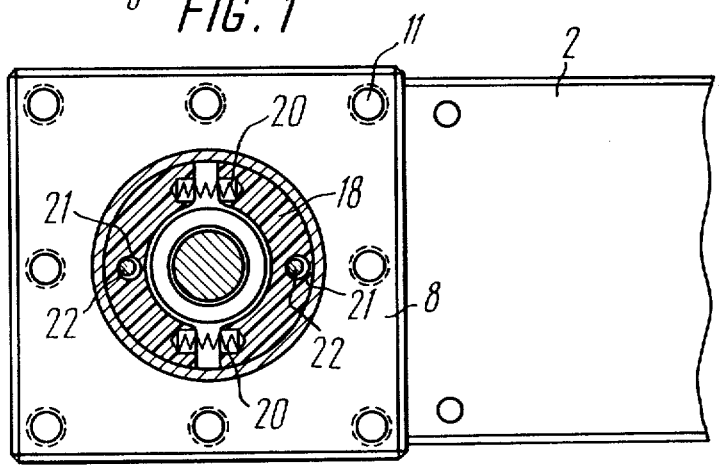
FIG. 2 is a sectional view along lines II—II of FIG. 1.

A multiholder tool head comprises a base 1 which is rigidly fixed to the slide 2 of a machine tool. This base 1 has a cone-shaped portion 3 with a flange 4 formed on the larger side of the cone, said flange being provided with openings adapted to receive screws 5 used to attach the base to the slide 2, and a cylindrical neck 6 entering an opening formed in the slide 2.

The base 1 is also provided with a shank 7 disposed on the smaller side of the cone 3 coaxially thereto. A toolholder 8 is mounted on the conical portion 3 of the base. The toolholder 8 is essentially a parallelepiped-shaped block with grooves 9 made in the sides of the block and adapted to receive a cutting tool 10 to be fixed by screws 11. A taper bore is made in the toolholder 8 coaxially with the conical portion 3, the profile of this bore conforming to that of the conical portion 3 of the base and having the surface finish which ensures smooth rotation of the toolholder 8 with respect to the base 1.

A stepped recess is provided in the bottom (according to the drawing) surface of the toolholder 8, said recess embracing a projection formed on the slide 2 and the flange 4 of the base 1, thereby preventing cooling liquid and chips from entering the contacting surfaces of the base 1 and the toolholder 8.

The multiholder tool head is equipped with a clamp 12 adapted to position the toolholder 8 on the base 1, a socket 13 defined by two perpendicularly disposed surfaces A and B, which are in parallel with the rotational axis of the toolholder, being provided in the base 1 to accommodate the clamp 12 during the rotation of the toolholder 8, the surface A being in constant engagement with the clamp 12. The other surface B has an opening normal thereto, said opening receiving a pusher 14 with a spring 15, said pusher engaging the clamp 12. To clamp the toolholder 8 with respect to the base 1 in a number of the predetermined positions defined by orientation of the cutting tool 10, recesses 16 are provided in the toolholder 8 adapted to locate the clamp 12 in any of the predetermined positions between the surface of one of the recesses and the surface A of the socket 13.

A hub 17 is mounted on the shank 7 of the base 1, said hub being provided with an axial bore having an inner thread for screwing this hub onto the shank 7 which is provided with an external thread for this purpose.

The hub 17 is adapted to clamp the toolholder 8 with respect to the base 1.

One of the main requirements imposed upon the tool heads is the positional stability of the toolholder 8 along with the tool 10 in the predetermined locking position to ensure the accuracy of articles in a batch. Permissible deviations from the predetermined position are within the limits of microns. To ensure such an accuracy the clamp 12 is fitted between the base 1 and the toolholder 8 in its locked position without a gap, while to ensure the biasing of the clamp to the surfaces of the socket 13 and the recess 16 under the constant force irrespective of external factors, the toolholder 8, according to the invention, is provided with carrier means maintaining the constant torque during the rotation of the toolholder 8.

The carrier means comprises frictional clutch memmbers 18 accommodated in the hub 17. A bore 19 is formed in the hub 17 for this purpose. Each clutch member comprises a half-ring made of the material, such as textolite with relatively high coefficient of friction. The surface finish on sides of each half-ring ensures good fitting thereof with respect to the inner surface of the hub 17.

The half-rings define a gap therebetween in a centerplane in the cylindrical bore 19 of the hub 17.

Coaxial blind openings are formed in the surfaces of the half-rings 18, facing each other the axes of these openings being normal to said centerplane. A compression spring 20 is inserted into each pair of the associated openings of the half-rings 18, the springs biasing the sidewalls of each of the half-rings 18 to the inner surface of the hub 17. A through opening 21 is provided in each half-ring 18. The axes of these openings are in the same plane which passes through the axis of the cone 3 of the base 1 and is parallel with the axes of the openings accommodating the springs 20. Fingers 22 are loosely fitted in the openings 21, the ends of these fingers being press-fitted into openings provided in the body of the toolholder 8. The fingers 22 are adapted to transmit the torque from the hub 17 through the clutch members 18 of the toolholder 8. A handle 23 is provided to rotate the hub 17 about its axis, the end of the handle being fixed to the hub by means of a pin 24.

To reduce friction between the surface of the hub and that of the toolholder 8 during the rotation of the hub, a thrust bearing 25 is disposed between the end face of the hub 17 and the surface of the toolholder 8. The provision of the bearing makes it possible to reduce the force applied to the handle 23 for rotation of the hub 17. An intermediate ring 26 is interposed between the thrust bearing 25 and the end face of the hub 17, the height of this intermediate ring being selected to suit the position of the handle 23 after the toolholder 8 with the cutting tool 10 has been locked in the predetermined position.

The diameter of the clutch members 18 and the rigidity of the springs 20 are selected depending on the amount of the torque to be transmitted from the handle 23 to the toolholder 8.

The apex angle of the cone 3 is chosen depending on the amount, of the torque provided no jamming occurs between the toolholder 8 and the cone 3 during the rotation of the former.

In the particular embodiment this angle is 40°.

In another embodiment of the tool head according to the invention, the socket 13 accommodating the clamp 12 during rotation of the toolholder 8 is made in the stem of the toolholder 8. This socket is defined by the plane A and a curvilinear surface C. An opening is made in the surface C, the axis of the opening being in parallel with the plane A. A spring 15 and a pusher 14 are accommodated into this opening. The spring 15 rests against a plug 27 fitted at the outlet of the opening provided in the toolholder 8. The recesses adapted to accommodate the clamp 12 between the surface of one of these recesses in each of the predetermined positions of the toolholder 8 and the plane A of the socket 13 are defined on the surface of the cone 3 in the same plane normal to the axis of the base 1.

According to both embodiments of the invention the clamp 12 is essentially a cylindrical roller whose axis is parallel to the rotational axis of the toolholder 8. The plane A of the socket 13 and the surface of the recess 16 inbetween which the clamp 12 is located at the moment of locking the toolholder 8, are made parallel to each other.

In the multiholder tool head made in accordance with the invention the conical surface of the base 1 and that of the toolholder 8 are in constant engagement thereby preventing foreign objects from entering therebetween and increasing positional stability of the toolholder with respect to the base 1. The provision of the toolholder 8 with the carrier means improve the working conditions of the tool head due to the fact that only a single handle 23 is to be used to rotate the toolholder 8.

The multiholder tool head operates as follows. In the initial inoperative position the hub 17 biases the toolholder 8 to the cone 3 of the base 1 through the intermediate ring 26 and the thrust bearing 25. In this position the toolholder 8 is fixed to the base 1 and the clamp 12 has no gap between the plane A of the socket 13 and the surface of the recess 16. The chosen position of the toolholder 8 is determined by the type of the tool 10 to be used. To locate the toolholder 8 into the subsequent predetermined position, the hub 17 is to be rotated counterclockwise by means of the handle 23. Upon this rotation the hub 17 moving up the threaded shank 7 of the base 1 releases the toolholder 8. Due to the fact that the clutch members 18 are in constant engagement with the surface of the cylindrical bore 19 of the hub 17 under the action of springs 20, the further rotational movement of the hub 17 is transmitted to the members 18 carrying the fingers 22 which are press-fitted into the body of the toolholder 8. In this manner the rotation of the toolholder 8 with respect to the base is performed. Upon rotation of the toolholder 8 the recess 18 is shifted and the clamp 12 enters the socket 13 under the action of the pusher 14 and compresses the spring 15. The rotational movement of the hub 17 is continued until the clamp 12 enters the next recess 16 under the action of the pusher 14 biased by the spring 15, this next recess being associated with the next position of the toolholder 8 and, therefore, with the new type of the tool 10 required for machining the workpiece.

Thereafter, the hub 17 is rotated clockwise by means of the handle 23 to lock the toolholder 8 in this position with respect to the base 1.

As a rule, gaps occurs between the plane 1 of the socket 13, the clamp 12 and the surface of the recess 16 as a result of uncertainty of the position of the clamp 12 at the end of the counterclockwise rotation of the toolholder 8. These gaps are eliminated upon the clockwise rotation of the hub 17 through the handle 23. The rotation is transmitted to the toolholder 8 from the hub 17 through the clutch members 18 and the fingers 22 until the clamp 12 is fixed between the plane A of the socket 13 and the surface of the recess 16. Thus the toolholder takes the locked position. During the subsequent rotation of the hub 17 the fingers 22 rigidly fixed in the toolholder 8 prevent the members 18 of the clutch from rotation and the surface of the cylindrical bore 19 provided in the hub 17 slides over the sidewall surface of the parts 18 thereby ensuring the constant torque during the rotation of the hub, this constant torque making it possible for the clamp 12 to be pressed against the surfaces of the socket 13 and the recess 16 with a constant force and thus the constant amount of deformation thereof. This is an essential requirement for ensuring the high positional stability of the toolholder 8 along with the tool 10 in the predetermined positions. The hub 17 moving down the threaded shank 7 of the base 1 presses the toolholder 8 against the surface of the cone 3 of the base 1 through the intermediate ring 26 and the thrust bearing 25.

Apart from the predetermined positions, the toolholder 8 may be located in any intermediate position in the cases where it is necessary to change the orientation of the tool 10 with respect to the workpiece for performing operations, such as deburring or chamfering, not requiring the exact position of the tool.

In this case the clamp 12 is accommodated in the socket 13 and has no contact with any of the recesses 16.

What is claimed is:

1. A multiholder tool head comprising: a cone-shaped base; a toolholder rotatably mounted on said base and adapted to be fixed thereto, said toolholder engaging the base over the conical surface thereof and being provided with a carrier for rotation thereof; a spring-loaded clamp essentially forming a body of rotation being adapted to lock said toolholder on said base in any predetermined position with respect thereto after having been rotated into this position, said clamp being provided with a socket made in one of the engaging parts to accommodate the clamp during the rotation of said toolholder, in the other of the engaging parts said clamp being provided with recesses equal in number to said predetermined positions for clamping the toolholder, said clamp projecting beyond the socket into one of said recesses, the path of movement of said clamp extending in a plane transverse with respect to the rotational axis of said toolholder and being directed along the chord of a circle of the cross-section of the base located in said plane; the socket accommodating the clamp during the rotation of the toolholder being made in the base and the recesses being made in the toolholder; said clamp comprising a cylindrical roller, the axis of said roller being in parallel with the rotational axis of the toolholder.

2. A multiholder tool head comprising: a cone-shaped base; a toolholder mounted on said base and adapted to be fixed thereto, said toolholder engaging the base over the conical surface thereof and being provided with a carrier for rotation thereof; a spring-loaded clamp essentially forming a body of rotation being adapted to lock said toolholder on said base in any predetermined position with respect thereto after having been rotated into this position, said clamp being provided with a socket made in one of the engaging parts to accommodate the clamp during the rotation of said toolholder, in the other of the engaging parts said clamp being provided with recesses equal in number to said predetermined positions for clamping the toolholder, said clamp projecting beyond the socket into one of said recesses, the path of movement of said clamp extending in a plane transverse with respect to the rotational axis of said toolholder and being directed along the chord of a circle of the cross-section of the base located in said plane; said carrier comprising a hub disposed above the toolholder coaxially thereto and being provided with friction clutch members accommodated therein, at least one resilient element being disposed between said members, said element pressing each of the members against the inner surface of the hub to transmit the torque from said hub to the toolholder, and two fingers rigidly fixed in the toolholder and disposed in parallel with the rotational axis thereof and passing through openings provided in each of the parts, said socket accommodating the clamp during the rotation of the toolholder being made in the base and the recesses being made in the tool holder, said clamp comprising a cylindrical roller the axis of said roller being in parallel with the rotational axis of the toolholder.

* * * * *